(No Model.)
W. F. KISTLER.
FLOUR SIFTER.
No. 309,065. Patented Dec. 9, 1884.
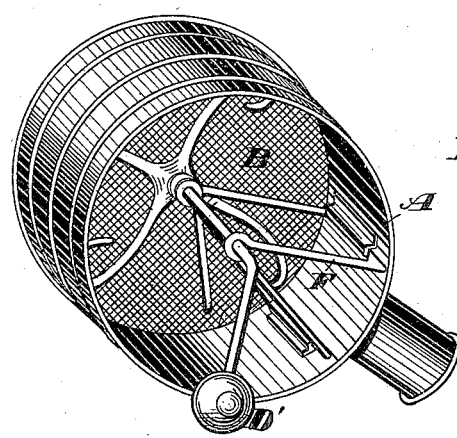
Fig. 1.
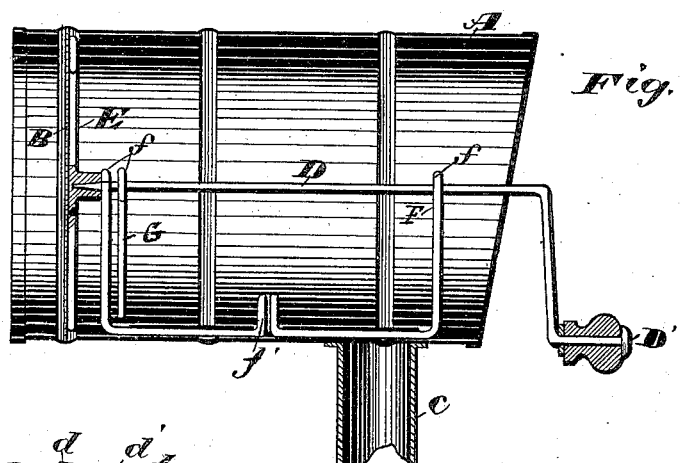
Fig. 2.
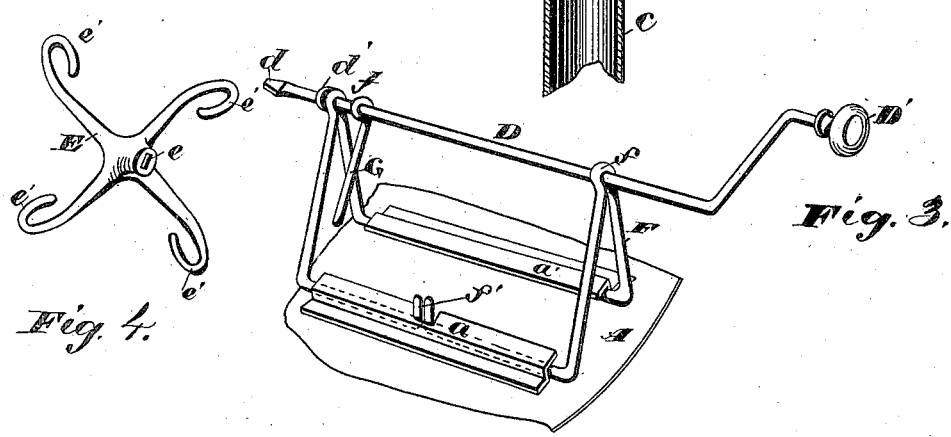
Fig. 4.
Fig. 3.
WITNESSES
Wm. M. Monroe.
Geo. W. King.
INVENTOR
Willoughbay F. Kistler.
by
Leggett & Leggett
Attorneys

UNITED STATES PATENT OFFICE.

WILLOUGHBAY F. KISTLER, OF CLEVELAND, OHIO, ASSIGNOR OF ONE-FOURTH TO WILLIE E. DENNING, OF SAME PLACE.

FLOUR-SIFTER.

SPECIFICATION forming part of Letters Patent No. 309,065, dated December 9, 1884.

Application filed April 15, 1884. (No model.)

*To all whom it may concern:*

Be it known, that I, WILLOUGHBAY F. KISTLER, of Cleveland, in the county of Cuyahoga and State of Ohio, have invented certain new and useful Improvements in a Flour-Sifter; and I do hereby declare the following to be a full, clear, and exact description of the invention, such as will enable others skilled in the art to which it pertains to make and use the same:

My invention relates to improvements in a flour-sifter; and it consists in certain features of construction and in combination of parts hereinafter described, and pointed out in the claims.

The object of my invention is to improve a device on which I have already obtained Letters Patent of the United States No. 205,560, granted July 2, 1878.

In the accompanying drawings, Figure 1 is a view in perspective, and Fig. 2 a longitudinal section, of my improved scoop and attachments. Figs. 3 and 4 are views in perspective in detail.

A represents the body of an open-bottom cylindrical scoop provided near the lower end with the flat sieve B, and on the side with the handle C. D is a wire spindle, bent as shown, to form a crank at the upper end, and provided with the handle D'. The lower end is flattened, as shown at d, to engage the socket e of the agitator E. The spindle D is supported by the bracket-frame F, that is made of a single piece of wire looped around the spindle, so as to form bearings f for the spindle, and bent in the manner shown, with the two ends turned up and soldered together, as shown at f', forming a thumb-piece. Pieces of metal a and a', bent as shown, are soldered to the part A, the free edges overhanging the side pieces of the frame F and holding them in position. The legs of the frame F pass close to the ends of the strips a and a', so that the frame is held endwise thereby. The spindle is provided with the collar d', that engages the frame F, and by means of which and by the elasticity of the frame the spindle is held down and the agitator caused to pass gently over the sieve. By reason of the close proximity of the lower legs of the frame F and the agitator the frame acts as a breaker to crush the lumps of flour. An arm, G, secured to the spindle above the lower legs of the frame, forms a revolving breaker for the same purpose. The arms of the agitator are slightly curved in the direction of rotation, and bent backward and inward, as shown at e', so that they reach up into the flour and help to force it down and prevent its clogging. The arms of the agitator and the arm G operate, respectively, above and below the lower stationary arms of the frame, and are effective in breaking the lumps of flour and feeding it to the sieve.

In removing the frame and attachments for cleaning, by pressing laterally on the thumb-piece f' the side of the frame may easily be pressed back from under the strip a, so that the frame is relieved. These scoops are usually made of such size as to hold a given quantity—say two quarts, three pints, &c.—and are therefore convenient for measuring flour or other material. There are but few pieces, and the construction is extremely simple, and the device may be made at a small initial cost.

What I claim is—

1. The removable frame F, constructed of a single piece of wire bent in the manner shown, the ends forming a thumb-piece, in combination with the strips a and a', the spindle D, and the body A, substantially as set forth.

2. The combination of the spindle provided with a crank, the arm G, the collar d', and the flattened end d, the agitator E, provided with the socket e, and arms bent in the manner shown, and the body A, substantially as set forth.

3. The combination, with the agitator E, the arm G, and a spindle common to both, of the frame F, the lower arms of which are arranged intermediate of the parts E and G, and in such proximity thereto as to form a suitable breaker, substantially as set forth.

4. The frame F, consisting of a single piece of wire, bent as shown, and adapted by its elasticity to be sprung together to engage with or to be disengaged from a suitable support, substantially as set forth.

In testimony whereof I sign this specification, in the presence of two witnesses, this 7th day of April, 1884.

WILLOUGHBAY F. KISTLER.

Witnesses:
ALBERT E. LYNCH,
CHAS. H. DORER.